Feb. 8, 1927.
A. LAUGHLIN, JR
1,616,861
METHOD AND APPARATUS FOR MANUFACTURING TUBING
Filed Nov. 15, 1923  2 Sheets-Sheet 1
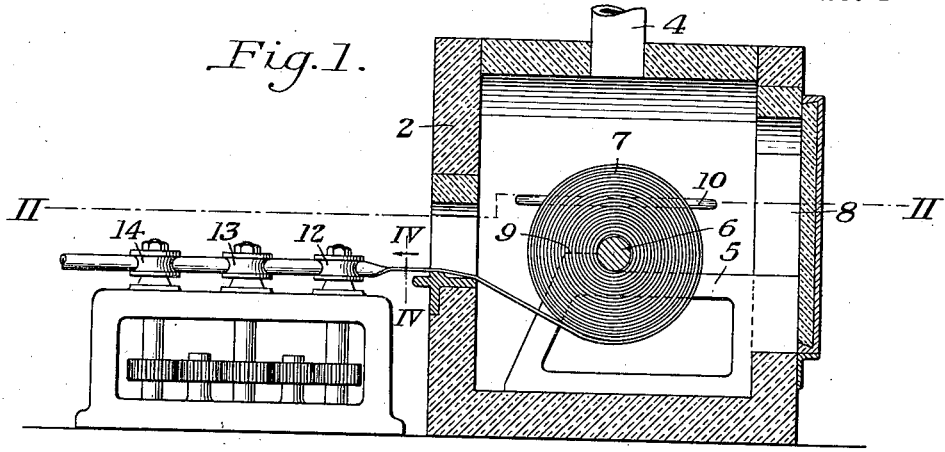
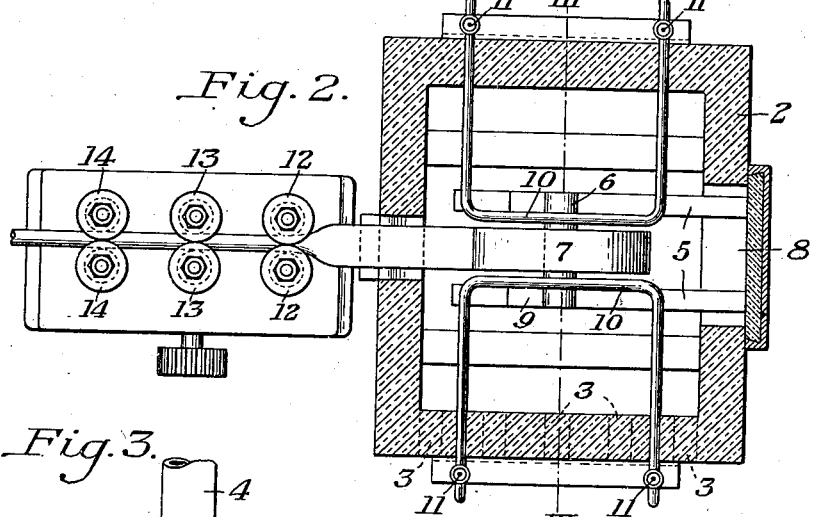
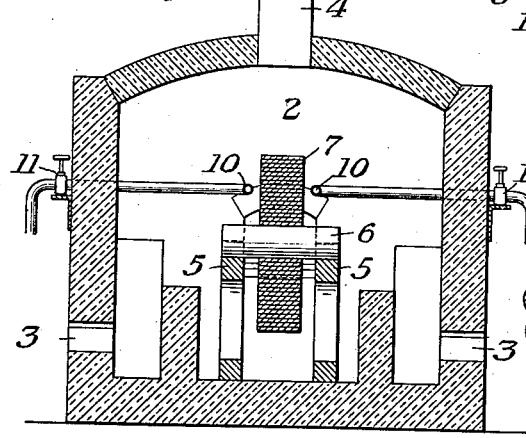
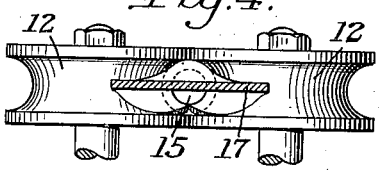
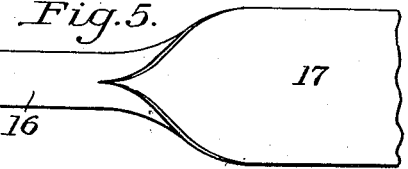
INVENTOR
Alexander Laughlin Jr.,
by Byrnes, Stebbins & Parmelee,
his attys.

Feb. 8, 1927.
A. LAUGHLIN, JR
1,616,861
METHOD AND APPARATUS FOR MANUFACTURING TUBING
Filed Nov. 15, 1923    2 Sheets-Sheet 2
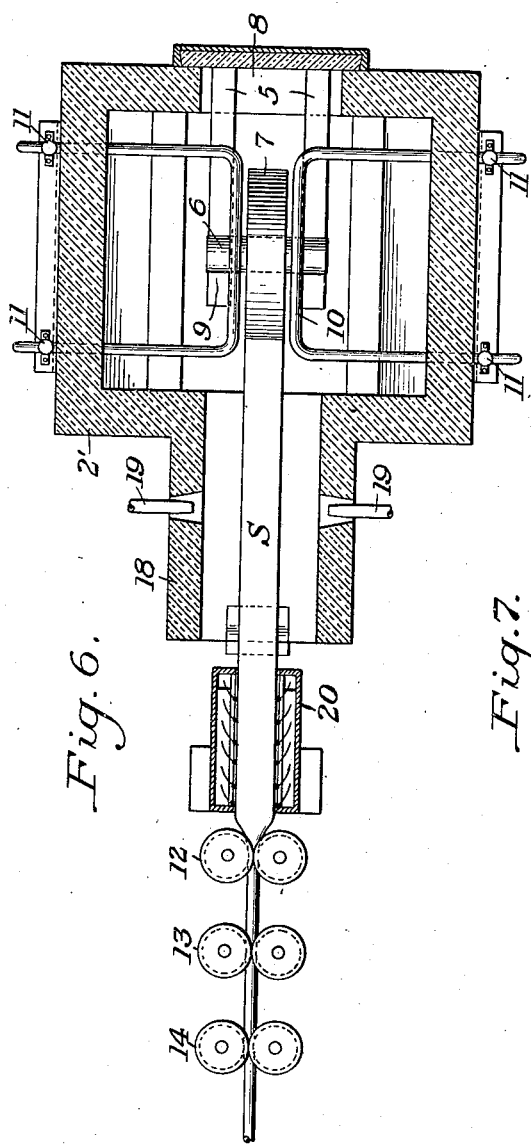
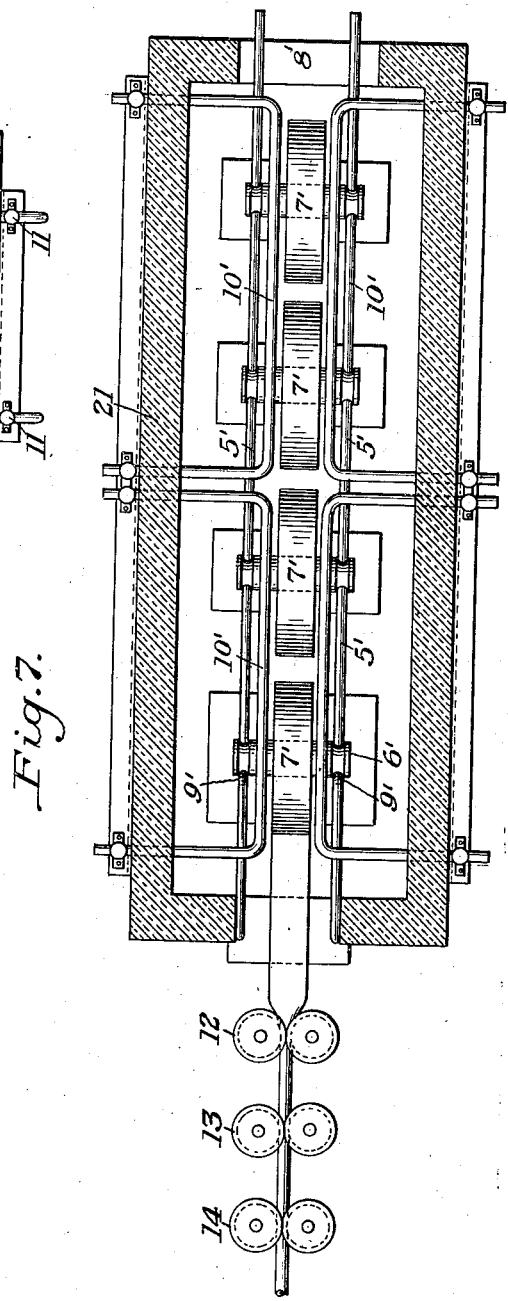
INVENTOR
Alexander Laughlin Jr.
By Byrnes, Stebbins & Parmelee,
his Attys.

Patented Feb. 8, 1927.

1,616,861

UNITED STATES PATENT OFFICE.

ALEXANDER LAUGHLIN, JR., OF EDGEWORTH, PENNSYLVANIA; MARGARET M. LAUGHLIN AND THE UNION TRUST CO. OF PITTSBURGH, EXECUTORS OF SAID ALEXANDER LAUGHLIN, JR., DECEASED, ASSIGNORS TO CENTRAL TUBE COMPANY, OF PITTSBURGH, PENNSYLVANIA, A CORPORATION OF PENNSYLVANIA.

METHOD AND APPARATUS FOR MANUFACTURING TUBING.

Application filed November 15, 1923. Serial No. 674,843.

The present invention relates broadly to the art of manufacturing tubes, and more particularly to the making of butt welded tubes.

It is customary in the art to which this invention relates to manufacture tubes of the nature herein contemplated from relatively short straight lengths of strips which are heated in an ordinary heating furnace. The length of the furnace required and the lack of strength of the strips when heated to the required temperature for welding has limited the length of tubes manufactured in this manner. As it is necessary to lose two crop or scrap ends from each length of tube made by any process, it is apparent that any method enabling the manufacture of longer lengths will be decidedly advantageous as tending to decrease the percentage of scrap to the final product.

In accordance with the present invention, there is provided an improved method and apparatus for forming tubing in greater lengths by heating the strip material while in coil form. Not only does this enable the use of smaller furnaces, but it also permits the handling of much longer strips, and consequently, the production of longer pieces of tubing.

In the accompanying drawings, there is illustrated more or less diagrammatically one form of apparatus by which the present invention may be carried out, it being understood that these drawings do not define the limits of my invention, as changes in the construction therein disclosed may obviously be made without departing from the spirit of my invention or scope of my broader claims.

In the drawings:

Figure 1 is a view partly in side elevation and partly in longitudinal section of one form of apparatus in accordance with the present invention;

Figure 2 is a horizontal sectional view on the line II—II of Figure 1;

Figure 3 is a transverse sectional view on the line III—III of Figure 2;

Figure 4 is a detail sectional view on an enlarged scale on the line IV—IV of Figure 1;

Figure 5 is a detail view on an enlarged scale illustrating a portion of a partially formed tube; and Figures 6 and 7 are views similar to Figure 2, illustrating modified embodiments of the invention.

In carrying out the present invention, there may be provided a furnace 2 of any desired construction adapted to be heated in the usual manner, as by fuel and air admitted through ports 3, there being a stack 4 for the offtake of the products of combustion. Formed within the furnace and located substantially centrally thereof are upwardly projecting parallelly extending spaced supports 5, adapted to receive thereon a shaft 6, carrying a coil 7 of strip material or skelp from which a length of tube is to be formed. The supports at their rear ends may be extended to a charging door 8, to provide tracks, along which the coil of material is rolled into the furnace. At their inner ends, the supports may be extended upwardly, as indicated at 9, to form a stop limiting the further travel of the material.

In order to guide the coil within the furnace, there may be provided suitable guides 10, extending laterally into the furnace from either side thereof and carried by clamping means 11, whereby they may be adjusted inwardly or outwardly for coils of different widths, as will be apparent. These guides preferably comprise hollow tubes adapted to be connected at one end to a source of cooling fluid, whereby they are prevented from burning out.

Located in front of the furnace is a suitable drawing, forming and welding apparatus, comprising preferably a plurality of pairs of rolls 12, 13 and 14, adapted to be driven in any desired manner, as well understood in the art. All these rolls may have their axes extending vertically, as illustrated in the drawings, or certain of the rolls may have their axes extending at an angle to the others, as indicated, for example, in the patent to Crea, No. 354,102 of December 14, 1886.

In accordance with the preferred embodiment of the present invention, one of the pairs of rolls, preferably, the pair 12, is adapted to effect the initial shaping of the strip to bring the heated edges of the strip into position for welding. The pair of rolls 13 in such a construction will serve to further compress the shaped tube, and effect a completion of the weld. The rolls 14, of which any desired number may be provided, are for the purpose of straightening the pipe or tube and reducing its external diameter to the exact size commercially required.

In Figure 4 of the drawings, there is illustrated in detail the pair of rolls 12, these rolls being indicated as provided with a substantially circular pass 15. It will be understood, however, that the shape of the pass may be varied, as desired, from a circular to an elliptical shape, as suggested for example in the Patent to Blakey, No. 148,406 of March 10, 1874.

In the operation of the present invention, a strip of material to be formed into a tube is coiled, whereby each successive coil or convolution serves to shield or protect the main body of the portion of the strip immediately underlying the same. In the finished coil, substantially the entire main body portion of the strip will be covered so that upon rolling the coil into the furnace and heating the same, the free exposed edges will be brought to a relatively higher temperature than the main body portion. This constitutes a decided advantage of the present invention, as heretofore when strips have been heated to the temperature required for effective welding, this temperature being very near the melting point in most cases, the entire strip was rendered so soft and ductile as to make it liable to be torn in the mechanical operation of drawing it through the dies or rolls in which it was welded. By the present method, however, the edges may be easily brought to, or substantially to, welding temperature, without heating the main body of the material to a temperature sufficient to materially affect its strength. After the free edges of the material reach the desired temperature, the free end thereof may be caught with a pair of tongs and pushed or pulled into the first set of rolls which are rotated in such direction as to pull the strip of material continuously into and through them. This tends to rotate the coil on the shaft 5 until the entire length of the strip has been formed into a tube. Thereafter, another coil is placed in the furnace and the entire operation repeated as desired.

In the manufacture of tubing at the present time, considerable difficulty is frequently encountered in properly starting the drawing of the strip through the dies or bells. In accordance with the present invention, before placing a coil or strip within the furnace, I may point or shape the free outer end thereof, as indicated at Figure 5, by completely or partially forming such end into substantially circular section, as indicated at 16. In this manner, it is only necessary to bring this portion into position between the first set of rolls, whereupon they immediately grip the same and effect the desired movement of the material therebetween. As the flat portion 17 approaches the rolls, it will be understood that the edges thereof are forced inwardly more and more, until the edges are brought together between the rolls under sufficient pressure to produce the weld. This method of permitting the starting of the welding operation is disclosed and claimed in my copending application Serial No. 674,844 filed on the same date herewith.

With certain materials, in order to prevent the possibility of sticking of the successive convolutions when the edges are brought to welding temperature with the material in coil form, the heat may be regulated to bring these edges to a temperature slightly below that required for welding. Thereafter, as the strip is drawn into the forming means, there may be directed against the exposed edges thereof a blast of gas containing oxygen, as disclosed for example in the patents to Moon et al. Nos. 1,026,103 and 1,026,275 of May 14, 1912. In this manner, the temperature of the edges, after leaving the coil, may be raised an amount sufficient to insure proper welding thereof.

In Figure 6 there is illustrated one form of apparatus particularly adapted for increasing the temperature of the edges of the strip as it is withdrawn and passed to the forming means. In this embodiment, the furnace 2' is illustrated as having an outlet tunnel or muffle 18, into which may project burners 19, adapted to direct a flame against the edges of the strip S for further increasing the temperature thereof. In still other cases, the burners 19 may be omitted or their action may be augmented by the use of a blast pipe 20 of the character shown in the Moon patents referred to or of other suitable construction for directing a blast containing oxygen against the edges of the strip. In this manner, the strip may be heated in coil form to a point below the welding temperature, and thereafter, the temperature of the edges may be raised as the strip is uncoiled, whereby all sticking is obviated and the strength of the strip not materially affected.

In Figure 7, there is illustrated a modified furnace construction 21, adapted to receive a plurality of coils 7' of strip material. These coils may be successively charged into the furnace in any suitable manner whereby the axles 6' are caused to roll upon the supports 5'. The supports 5' are shaped in suitable manner to provide stops 9' limiting the travel of the front coil and enabling the strip to be unwound as required. After each coil has been completely formed into a tube, and is shaped, the axle may be suitably removed from the furnace, and a fresh coil charged into the rear end. It will be apparent that movement of the coils through the furnace may be obtained in any suitable manner, and that any desired number of guides 10', similar to those already described, may be provided.

With any of the forms of my invention herein contemplated, the temperature of the skelp may be brought to the welding point while in the coil, or the skelp may be additionally heated after it has been uncoiled.

With the form of the invention illustrated more particularly in Figure 7, the output of a given furnace is materially increased, as upon the completion of the tube formation from the strip of wound coil, the succeeding coil is ready to be formed into a tube. Also the heat in the drawing apparatus is not lost between the formation of successive tubes.

With all embodiments of my invention I preferably utilize forming and welding rolls in place of the draw bench customarily employed. These draw benches, together with the bells or dies used therewith are objectionable from several standpoints. In the first place, a considerable amount of room is required, and a large number of attendants to handle the skelp and the tongs is necessary. A much more serious difficulty, however, arises from the tendency of the bells to burn, thereby causing them to exert a gradually decreasing pressure on the skelp, and also from the tremendous strain imposed on the hot metal as it is being drawn. It is apparent that both the burning of the bells and the strain on the metal increase with each increase in the length of tube. As the present invention contemplates the use of relatively great lengths of skelp, the forming rolls may be most advantageously utilized.

The advantages of my invention arise from the method of heating strip material for tube making in coil form, whereby the main body portion of the strip is shielded or protected from the heat and the mechanical strength of the strip retained and the use of longer strips made possible. Still further advantages arise from the method herein disclosed by means of which the use of large furnaces is obviated and the production of tubes in a more nearly continuous manner is insured.

I claim:

1. The method of manufacturing tubing, the steps comprising heating the opposite edges of a coiled strip whose temperature is below that required for welding to the temperature for welding, while maintaining the body portion of the inner convolutions at a lower temperature by the adjacent convolutions, and then bringing the heated edges of the strip into contact with each other while under welding pressure.

2. The method of manufacturing tubing, the steps comprising heating the opposite edges of a coiled strip whose temperature is below that required for welding to the temperature for welding, while maintaining the body portion of the inner convolutions at a lower temperature by the adjacent convolutions, and then withdrawing successive portions of the strip from the source of heat and welding the edges to each other.

3. The method of manufacturing tubing, the steps comprising heating the opposite edges of a coiled strip mounted for rotation whose temperature is below that required for welding to the temperature required for welding while maintaining the body portion of the inner convolutions at a lower temperature by the adjacent convolutions, and then uncoiling the strip and withdrawing successive portions thereof from the source of heat and welding the edges to each other during the withdrawal.

4. In apparatus for the manufacture of tubing a furnace having means for supporting a coil of strip material therein, means for limiting the lateral movement of a coil while so supported, and means for withdrawing successive convolutions from the coil and welding the same.

5. In the method of manufacturing tubing, the steps comprising heating a coil, and thereafter withdrawing successive convolutions of the coil and forcing the edges inwardly to round the strip.

6. In an apparatus for manufacturing tubing, a furnace having means therein for holding a coil of strip material, means for directly applying heat to the opposite edges of the coil, whereby the opposite edges of the coil are heated to a welding temperature before the body portions of the inner convolutions are raised to the welding temperature, and means for bringing the heated edges into welding contact with each other.

7. In an apparatus for manufacturing tubing, a furnace having means therein for holding a coil of strip material, means for directly applying heat to the opposite edges of the coil, whereby the opposite edges of the coil are heated to a welding temperature before the body portion of the inner convolutions are raised to the welding temperature, and means for uncoiling the heated strip and bringing the heated edges into welding contact with each other.

8. In an apparatus for manufacturing tubing, a furnace, means within the furnace for axially supporting a coil of strip material for rotation, means within the furnace for directly applying heat to the opposite edges of the coil whereby the opposite edges of the coil are heated to a welding temperature before the body portion of the inner convolutions are raised to the welding temperature, and a roll pass for uncoiling the strip and bringing the heated edges into welding contact with each other.

9. In the method of manufacturing tubing, the steps comprising heating a strip while in a coil to bring the edges thereof to the desired temperature, withdrawing successive convolutions of the coil, supplying additional heat to the strip as it is uncoiled, and then passing the same through a plurality of forming means.

10. In the method of manufacturing tubing, the steps comprising successively charging a furnace with coils of strip material, subjecting the coils to heat, and successively unwinding said coils while in the furnace and forming said coils into tubes while charging fresh coils into the furnace.

11. In the method of manufacturing tubing, the steps comprising heating a strip while in coil form to bring the edges thereof substantially to a welding temperature, and thereafter withdrawing successive portions from the source of heat and welding the same in at least one roll pass.

12. In the method of manufacturing tubing, the steps comprising heating a strip while in coil form to bring the edges thereof substantially to a welding temperature, and thereafter withdrawing successive portions from the source of heat and passing the same between a plurality of rolls for shaping and welding the same.

In testimony whereof I have hereunto set my hand.

ALEXANDER LAUGHLIN, Jr.